US008463990B2

(12) United States Patent
Arakawa

(10) Patent No.: US 8,463,990 B2
(45) Date of Patent: Jun. 11, 2013

(54) METHOD AND APPARATUS TO PERFORM AUTOMATED PAGE-BASED TIER MANAGEMENT OF STORING DATA IN TIERED STORAGE USING POOL GROUPS

(75) Inventor: Hiroshi Arakawa, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 411 days.

(21) Appl. No.: 12/794,865

(22) Filed: Jun. 7, 2010

(65) Prior Publication Data

US 2011/0302386 A1 Dec. 8, 2011

(51) Int. Cl.
*G06F 12/00* (2006.01)
(52) U.S. Cl.
USPC ........... 711/114; 711/161; 711/162; 711/163; 714/2
(58) Field of Classification Search
USPC ............................... 711/114, 161–163; 714/2
See application file for complete search history.

(56) References Cited

U.S. PATENT DOCUMENTS

| 6,957,294 | B1 * | 10/2005 | Saunders et al. ................. 711/4 |
| 2007/0192560 | A1 | 8/2007 | Furuhashi | |
| 2009/0063767 | A1 * | 3/2009 | Graves et al. ................. 711/114 |
| 2010/0042797 | A1 * | 2/2010 | Asano et al. ................. 711/165 |
| 2010/0077168 | A1 | 3/2010 | Arakawa | |

OTHER PUBLICATIONS

U.S. Appl. No. 12/560,740, filed Sep. 16, 2009 in the name of Kawaguchi.

* cited by examiner

*Primary Examiner* — Matthew Bradley
(74) *Attorney, Agent, or Firm* — Mattingly & Malur, PC

(57) ABSTRACT

A storage controller performs: evaluating the pool groups based on a preset rule in order to determine an evaluation result for each pool group; using the evaluation results among the pool groups to determine which pool group is to be selected for performing allocation against portions of the one storage volume in response to receiving an instruction for rearrangement of data in the tiered storage, the instruction including a requirement to be satisfied in selecting a plurality of tiers within a pool group based on access characteristics for performing allocation against portions of the one storage volume, analyzing the pool groups according to the requirement to determine whether any of the pool groups is appropriate to possess the one storage volume for storing the data; and selecting the tiers within the pool group based on the access characteristics.

20 Claims, 14 Drawing Sheets

| TPV ID | Segment ID | Assigned | Pool Group ID | Tier | Pool Volume ID | Chunk ID | Under relocation |
|---|---|---|---|---|---|---|---|
| 0 | 0 | Yes | 1 | 1 | 12 | 56 | No |
| | 1 | No | - | - | - | - | - |
| | 2 | Yes | 1 | 2 | 230 | 29 | No |
| | : | | | | | | |
| 1 | 0 | Yes | 2 | 3 | 31 | 77 | No |
| | 1 | Yes | 2 | 2 | 22 | 90 | Yes |
| | 2 | No | - | - | - | - | - |
| | : | | | | | | |
| : | | | | | | | |

Fig. 3

| Pool Volume ID | Chunk ID | Pool Group ID | Tier | Usage | TPV ID | Segment ID |
|---|---|---|---|---|---|---|
| 0 | 0 | 1 | 1 | In Use | 14 | 35 |
| | 1 | 1 | 1 | Free | - | - |
| | 2 | 1 | 1 | In Use | 53 | 46 |
| | : | | | | | |
| | 4096 | 1 | 1 | Free | - | - |
| | 4097 | 1 | 1 | Free | - | - |
| | : | | | | | |
| : | | | | | | |
| 100 | 0 | 33 | 2 | In Use | 24 | 54 |
| | 1 | 33 | 2 | In Use | 32 | 74 |
| | 2 | 33 | 2 | Free | - | - |
| | : | | | | | |
| : | | | | | | |

| TPV ID | Segment ID | Read / Write | Access rate per unit time | Last access time | Average access length |
|---|---|---|---|---|---|
| 0 | 0 | Read | 15 | 2008/05/07 22:33:59.992 | 4096 |
| | | Write | 4024 | 2008/05/08 02:26:12.005 | 4096 |
| | 1 | Read | 2305 | 2008/05/08 01:02:10.100 | 1048576 |
| | | Write | 67 | 2008/05/07 23:40:01.090 | 1048576 |
| | : | | | | |
| : | : | | | | |

| TPV ID | Segment ID | Read / Write | Type | Monitored value | | | |
|---|---|---|---|---|---|---|---|
| | | | | 6/25/2007 7:00am~ 8:00am | 6/25/2007 8:00am~ 9:00am | 6/25/2007 9:00am~ 10:00am | ... |
| 0 | 0 | Read | Access rate | | | | ... |
| | | | Average access interval (s) | | | | ... |
| | | | Average access length (byte) | | | | ... |
| | | Write | Access rate | | | | ... |
| | | | Average access interval (s) | | | | ... |
| | | | Average access length (byte) | | | | ... |
| | 1 | Read | Access rate | | | | ... |
| | | | Average access interval (s) | | | | ... |
| | | | Average access length (byte) | | | | ... |
| | | Write | Access rate | | | | ... |
| | | | Average access interval (s) | | | | ... |
| | | | Average access length (byte) | | | | ... |
| | : | | | | | | |
| : | : | | | | | | |

Fig. 7

| Pool Group ID | Tier | Pool Volume ID | Capacity |
|---|---|---|---|
| 1 | 1 | 0 | 500 GB |
| | | 1 | 500 GB |
| | | : | : |
| | 2 | 100 | 1024 GB |
| | | 101 | 1024 GB |
| | | : | : |
| | 3 | 200 | 2048 GB |
| | | 201 | 2048 GB |
| | | : | : |
| | : | : | : |
| 2 | 1 | 0 | 500 GB |
| | | 1 | 500 GB |
| | | : | : |
| | 2 | 50 | 1024 GB |
| | | 51 | 1024 GB |
| | | : | : |
| | 3 | 150 | 2048 GB |
| | | 151 | 2048 GB |
| | | : | : |
| | : | : | : |
| : | : | : | : |

Fig. 10

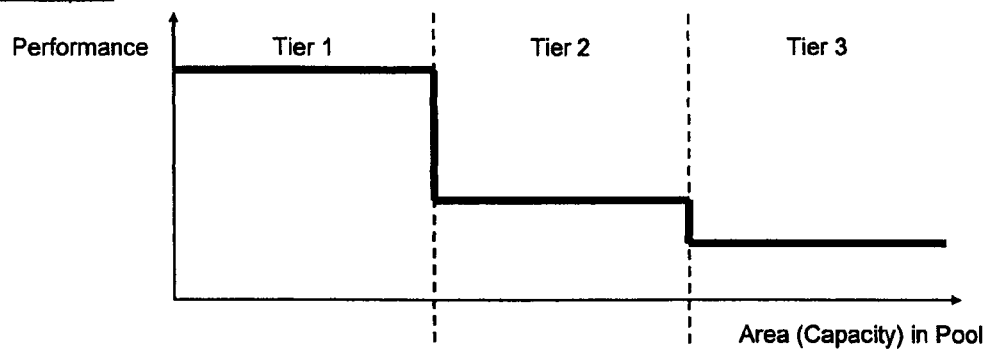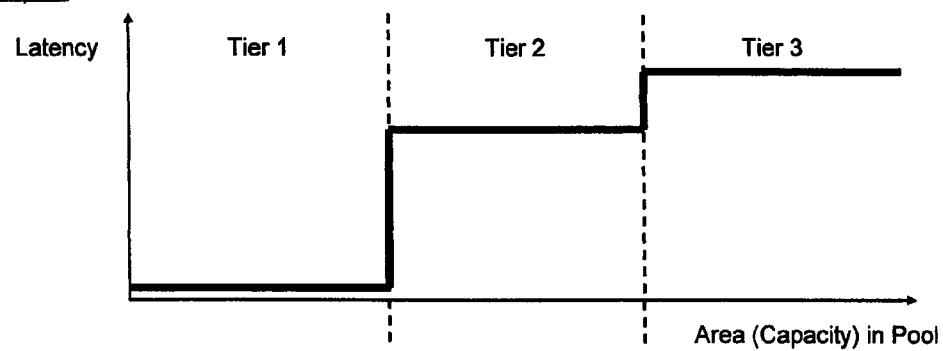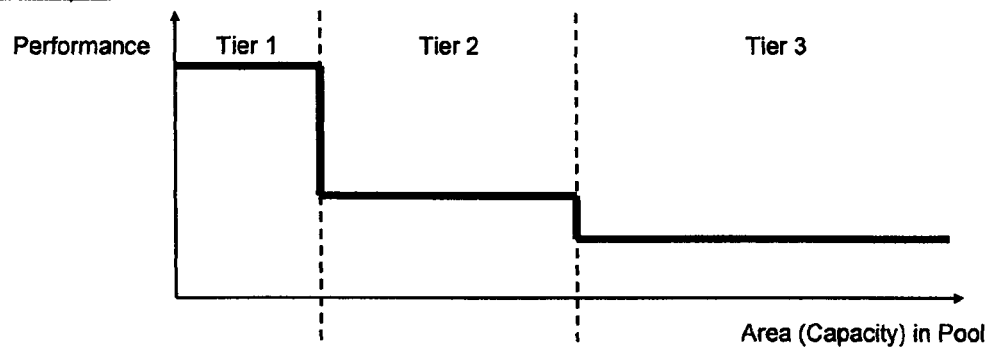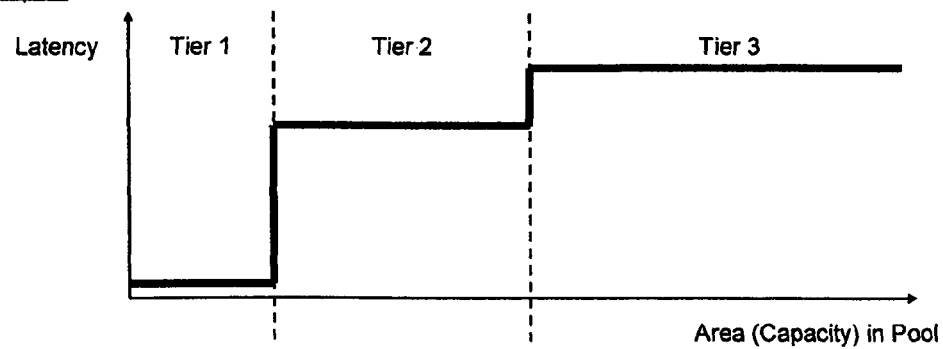
Fig. 11

Fig. 13

| Pool Group ID | Condition | score |
|---|---|---|
| 0 | 0< Access rate per unit time < 1500 | 0 |
| | 1500 < Access rate per unit time <= 3000 | 1 |
| | Access rate per unit time > 3000 | 2 |
| | Access Interval > two days | -1 |
| | : | |
| : | : | |

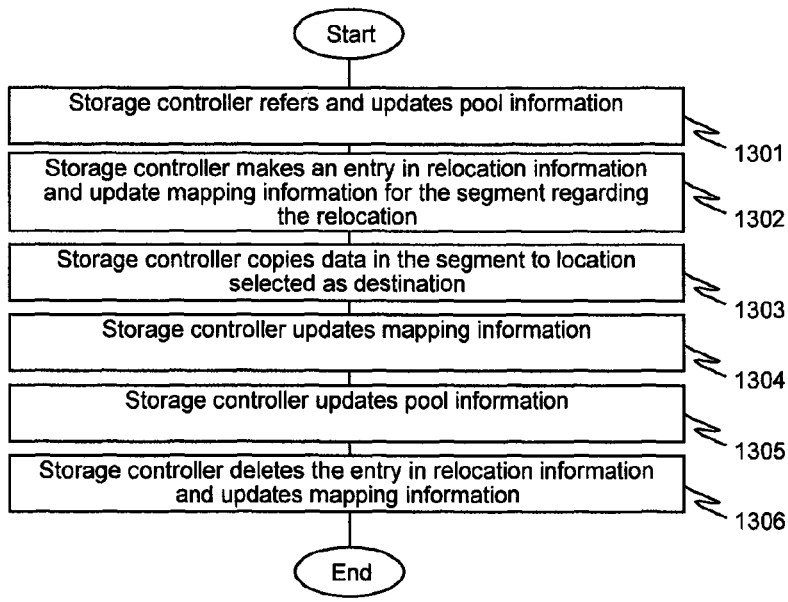

1301 Storage controller refers and updates pool information
1302 Storage controller makes an entry in relocation information and update mapping information for the segment regarding the relocation
1303 Storage controller copies data in the segment to location selected as destination
1304 Storage controller updates mapping information
1305 Storage controller updates pool information
1306 Storage controller deletes the entry in relocation information and updates mapping information

| TPV ID | Segment ID | Destination | | Copy pointer |
|---|---|---|---|---|
| | | Pool Volume ID | Chunk ID | |
| 0 | 0 | 27 | 28 | 204800 |
| 2 | 1 | 11 | 18 | 489600 |
| : | | | | |

METHOD AND APPARATUS TO PERFORM AUTOMATED PAGE-BASED TIER MANAGEMENT OF STORING DATA IN TIERED STORAGE USING POOL GROUPS

BACKGROUND OF THE INVENTION

The present invention relates generally to storage systems and, more particularly, to the management of special rearrangement in automated page-based tier management regarding storage resources.

Hierarchical storage management also called tier management is a storage management method designed for improving the utilization of storage resources in computer systems. Specifically, the utilization of resources is optimized by changing the location of data among storage resources in a computer system based on the worth and usage of the data in the enterprise. On the other hand, the analysis and the classification of the aforesaid worth and the usage are generally complicated tasks. Therefore, recently some storage system vendors proposed automated page-based tier management performed by a storage system. With this function, the storage system monitors access characteristics of each small data storage area, such as a page, in a data storage volume, or a file system region, and automatically relocates the data in the page based on the detected access characteristics. See, e.g., U.S. Patent Publication No. US2010/0077168. In addition, U.S. patent application Ser. No. 12/560,740, filed Sep. 16, 2009, discloses methods and apparatus for dynamic page reallocation storage system management. That invention provides a technique whereby the storage indicates the current tier load, the storage user can change the tier configuration rule, and the storage can reconfigure the tier configuration according to the tier configuration rule set by the storage user. In this way, the storage system can dynamically change the tier configuration based on input from the storage user according to the actual tier load. The entire disclosures of these references are incorporated herein by reference.

Using pages mentioned above for providing data storage volumes can achieve reduction of storage cost, management cost, and power consumption. This approach is called thin provisioning for storage. With thin provisioning, a storage system provides virtual volumes as storage area to store data for computers. For the virtual volumes, the storage system allocates and assigns physical area to only locations having write access of the computers. The total amount of used physical area in the pool can be smaller than the total amount of virtual area shown to the computers. To realize this capability, the storage system divides the storage area (e.g., storage area in HDD or flash memory) to a plurality of fixed-length areas called chunks or pages, and manages mapping between chunks and logical segments in the virtual volumes.

In addition to the aforesaid automated control, users need to make special rearrangement of data location for specific volumes, for example, to solve unexpected performance problems regarding use of data stored in the volumes. The manual rearrangement of data in tiered storage is also useful when the users can predict usage of data or have plan to use the data, in order to realize more efficient use of storage resources.

BRIEF SUMMARY OF THE INVENTION

Exemplary embodiments of the invention provide a method and an apparatus to realize manual/special rearrangement of data in tiered storage in a situation where automated page-based tier management is performed. A storage system has plural storage resource groups (pool groups) that include plural types of storage resources such as flash memory (i.e., high performance and high cost media), FC HDD, SAS HDD, and SATA HDD (i.e., low cost and low performance media). The storage system performs automated page-based tier management in each group according to a rule predetermined or set by a user for each group. The rule can be a relation between access characteristics regarding each page and assignation of resources. For example, as one rule, the higher performance (higher cost) media can be assigned in the order of access rate. When the storage system receives an instruction to apply special requirements (e.g., requirements of performance or storage resource usage) for a specified volume, the storage system simulates a situation of the volume in the case of belonging to each group as evaluation to identify the group that satisfies the requirements. By the evaluation, if the storage system finds a group that will satisfy the requirements, the storage system chooses the group as a group that should possess the volume. Otherwise, the storage system may create a new group or perform nothing further after giving notice to the user.

In accordance with an aspect of the present invention, a storage system comprises a processor; a memory; a plurality of storage volumes each being associated with one of a plurality of pool groups, each one of the pool groups including some of the plurality of storage volumes each being classified into one of a plurality of tiers within the one pool group; and a storage controller configured to perform automated page-based tier management of storing data in tiered storage using the pool groups, the page-based tier management including selecting the plurality of tiers within a pool group based on access characteristics for allocation against portions of one of the plurality of storage volumes. The access characteristics are characteristics of access to the portions of the one of the plurality of storage volumes. The page-based tier management performed by the storage controller includes evaluating the pool groups based on a preset rule for the page-based tier management in order to determine an evaluation result for each pool group based on the preset rule. The storage controller is configured to use the evaluation results among the plurality of pool groups to determine which pool group is to be selected for allocation against portions of the one of the plurality of storage volumes. In response to receiving an instruction for rearrangement of data in the tiered storage, the instruction including a requirement to be satisfied in selecting the plurality of tiers within a pool group based on the access characteristics for allocation against portions of the one of the plurality of storage volumes, the storage controller is configured to analyze the plurality of pool groups according to the requirement to determine whether any of the plurality of pool groups is appropriate to possess the one of the plurality of storage volumes for storing the data.

In some embodiments, if at least one of the pool groups satisfies the requirement, the storage controller is configured to select a pool group that satisfies the requirement and perform relocation of the data to the selected pool group according to the instruction for rearrangement. One or more pool groups that satisfy the requirements are displayed to a user before the selection of the pool group. If none of the pool groups satisfies the requirement, the storage controller is configured to select a next best pool group from the plurality of pool groups and perform relocation of the data to the selected next best pool group according to the instruction for rearrangement. The page-based tier management performed by the storage controller includes evaluating the pool groups based on a preset rule for the page-based tier management in order to determine an evaluation result for each pool group based on the preset rule. The storage controller is configured to use the evaluation results among the plurality of pool groups to determine which pool group is to be selected for allocation against portions of the one of the plurality of storage volumes. None of the pool groups satisfies the requirement, and the storage controller is configured to select the next best pool group from the plurality of pool groups by analyzing relation between the evaluation results of the pool groups and the requirement.

In specific embodiments, if none of the pool groups satisfies the requirement, the storage controller is configured to create a new pool group that satisfies the requirement and perform relocation of the data to the new pool group according to the instruction for rearrangement. If none of the pool groups satisfies the requirement, the storage controller is configured to not perform relocation of the data according to the instruction for rearrangement. The portions of the one of the plurality of storage volumes are chunks which are allocated in response to a write command received by the storage system. The page-based tier management performed by the storage controller includes evaluating the pool groups based on a preset rule for the page-based tier management in order to determine a score for each pool group based on access characteristics according to the preset rule. The storage controller is configured to use the scores among the plurality of pool groups to determine which pool group is to be selected for allocation against portions of the one of the plurality of storage volumes. If none of the pool groups satisfies the requirement, alternative options of the rearrangement are displayed, and the storage controller accepts selection of one option from the alternative options.

In accordance with another aspect of the invention, a storage system comprises a processor; a memory; a plurality of storage volumes each being associated with one of a plurality of pool groups, each one of the pool groups including some of the plurality of storage volumes each being classified into one of a plurality of tiers within the one pool group; and a storage controller configured to perform automated page-based tier management of storing data in tiered storage using the pool groups, the page-based tier management including selecting the plurality of tiers within a pool group based on access characteristics for allocation against portions of one of the plurality of storage volumes. The access characteristics are characteristics of access to the portions of the one of the plurality of storage volumes. The page-based tier management performed by the storage controller includes evaluating the pool groups using a preset rule based on the access characteristics for the page-based tier management in order to determine an evaluation result for each pool group based on the preset rule. In response to receiving an instruction for rearrangement of data in the tiered storage, the instruction including a requirement to be satisfied in selecting the plurality of tiers within a pool group based on the access characteristics for allocation against portions of the one of the plurality of storage volumes, the storage controller is configured to analyze the plurality of pool groups according to the requirement and the evaluation results to determine whether any of the plurality of pool groups is appropriate to possess the one of the plurality of storage volumes for storing the data.

In some embodiments, the preset rule includes one or more conditions based on access characteristics, each condition having points associated with the access characteristics for the condition. The storage controller is configured to sum the points for the one or more conditions to obtain a score for each pool group and to use the scores among the plurality of pool groups to determine which pool group is to be selected for allocation against portions of the one of the plurality of storage volumes.

In accordance with another aspect of this invention, a storage system comprises a processor; a memory; a plurality of storage volumes each being associated with one of a plurality of pool groups, each one of the pool groups including some of the plurality of storage volumes each being classified into one of a plurality of tiers within the one pool group; and a storage controller configured to perform automated page-based tier management of storing data in tiered storage using the pool groups, the page-based tier management including selecting the plurality of tiers within a pool group based on the access characteristics for allocation against portions of one of the plurality of storage volumes in accordance to a requirement to be satisfied for rearrangement of data in the tiered storage. The access characteristics are characteristics of access to the portions of the one of the plurality of storage volumes. The storage controller is configured to analyze the plurality of pool groups according to the requirement to determine whether any of the plurality of pool groups is appropriate to possess the one of the plurality of storage volumes for storing the data.

These and other features and advantages of the present invention will become apparent to those of ordinary skill in the art in view of the following detailed description of the specific embodiments.

BRIEF DESCRIPTION OF THE DRAWINGS

FIG. 3 shows an example of the mapping information.

FIG. 4 shows an example of the pool information.

FIG. 6 illustrates an example of the access monitor information.

FIG. 7 illustrates another example of the access monitor information.

FIG. 10 illustrates an example of the pool group information.

FIG. 11 illustrates characteristics of storage resources classified as tiers in each pool group.

FIG. 13 illustrates an example of the scoring rule information.

FIG. 14 is a flow diagram illustrating an example of the relocation process.

FIG. 15 shows an example of the relocation information.

DETAILED DESCRIPTION OF THE INVENTION

Figure 1:
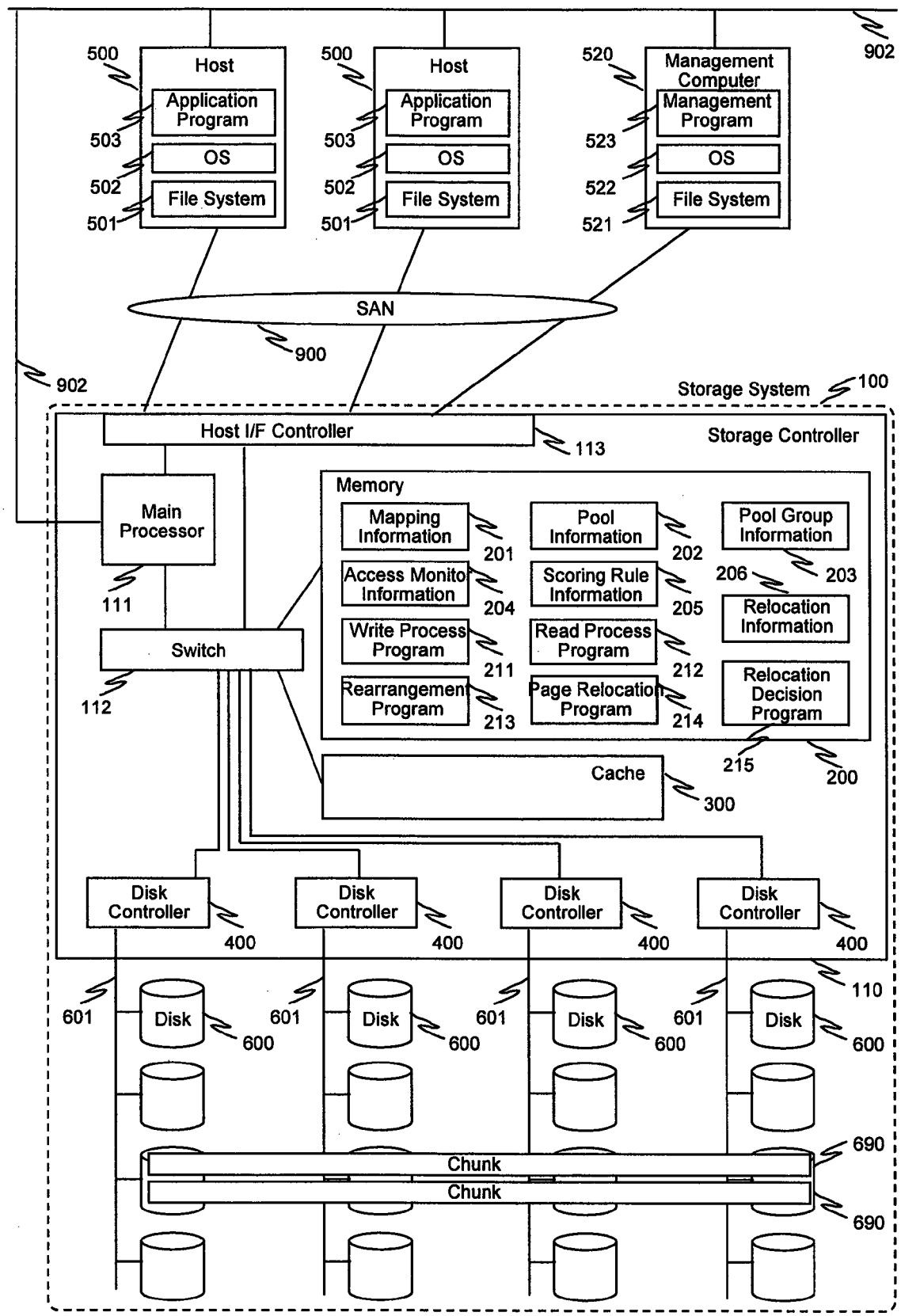
FIG. 1 illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for the management of special rearrangement in automated page-based tier management regarding storage resources.

A. System Configuration

FIG. 1 illustrates an example of a hardware configuration of an information system in which the method and apparatus of the invention may be applied. A storage system 100 includes a storage controller 110, a main processor 111, a switch 112, a host interface 113, a memory 200, a cache 300, disk controllers 400, disks 610 (e.g., HDD), and backend paths 601 (e.g., Fibre Channel, SATA, SAS, iSCSI(IP), etc.).

The main processor 111 performs various processes related to the storage controller 100. The main processor 111 and other components use the following information stored in memory 200: mapping information 201, pool information 202, pool group information 203, access monitor information 204, scoring rule information 205, and relocation information 206. The main processor 111 performs the processes by executing the following programs stored in memory 200, the details of which are described later: write process program 211, read process program 212, rearrangement program 213, page relocation program 214, and relocation decision program 215.

The host 500 and management computer 520 are connected to host interface 113 via SAN 900 (e.g. Fibre Channel, Fibre Channel over Ethernet, iSCSI(IP)). The host(s) 500, management computer 520, and storage controller 110 are connected with each other via the LAN 902 (e.g., IP network). The host 500 has a file system, an operating system 502, and an application program 503. To run these programs, the host 500 also has resources such as processor, memory, storage devices, and the like which are not shown in FIG. 1. The management computer 520 has a file system 521, an operating system 522, and a management program 523. To run these programs, the management computer 520 also has resources such as processor, memory, storage devices, and the like which are not shown in FIG. 1. The volumes (Logical Units) provided by the storage system 100 are produced from a collection of areas in HDDs. They may be protected by storing parity code (i.e., by RAID configuration) or mirroring.

B. Overview of Method to Providing Volumes

Figure 2:
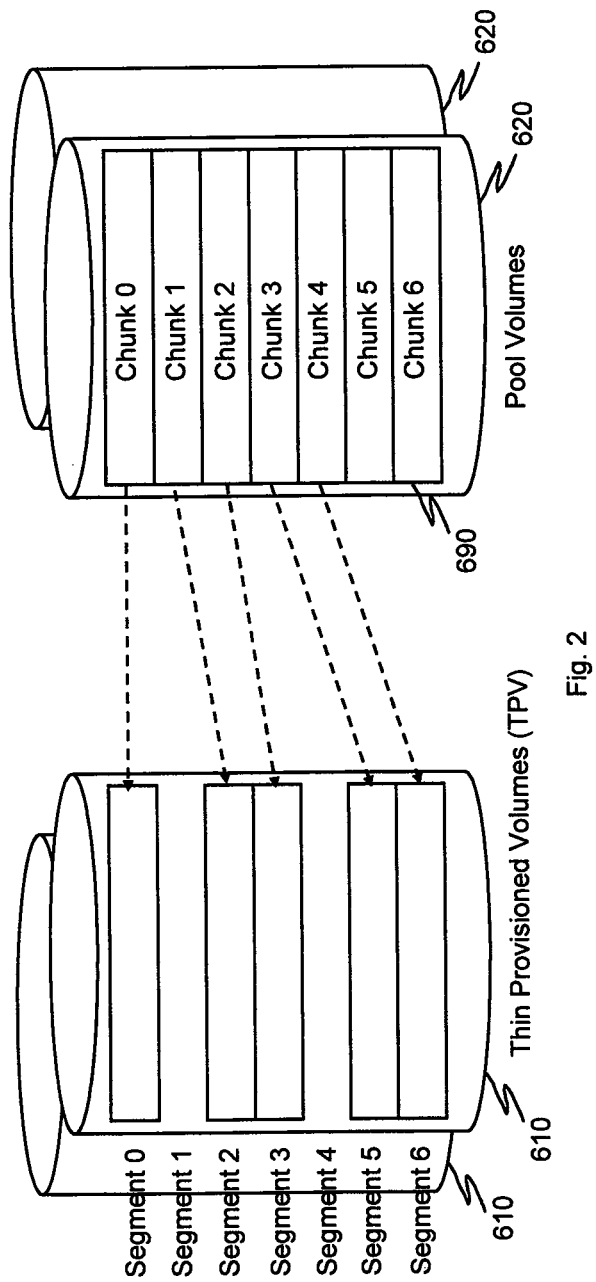
FIG. 2 shows the structure and method to provide TPV (Thin Provisioned Volume).

FIG. 2 shows the structure and method to provide TPV (Thin Provisioned Volume). The storage system 100 has pool volumes 620 and divides the pool volumes 620 into a number of fixed-length areas called chunks 690. The storage system 100 assigns a chunk 690 to a segment of a virtual volume (TPV) on write access. In other words, the physical storage area is assigned on demand. In FIG. 2, a TPV is constituted by multiple segments virtually, and a chunk 690 is allocated from the pool volume 620 and assigned to a segment (i.e., a fixed length area (page) of TPV). For example, chunk 4 is assigned to segment 6 in this figure. That is, a TPV is a page-based volume.

To achieve this, the storage controller 110 uses the mapping information 201 and pool information 202. FIG. 3 shows an example of the mapping information 201. This information maintains mapping between chunks and segments of each volume. The status of assignation is "No" if no chunk is assigned to the segment. The tier to which the segment belongs at that time is indicated in the "Tier" column. Tier means class of storage resources (media). Detailed explanation of tier is described below. The usage of a flag of "under relocation" is also described below. This information can be constructed as a list or a directory of each element for faster search.

FIG. 4 shows an example of the pool information 202. This information manages whether a chunk is used or not. By using this information, the storage controller 110 is able to find free (unused) chunks from a specified tier in the processes described below. The tier to which the chunk belongs at that time is indicated in the "Tier" section. This information also can be constructed as a list or a directory of each element in order to search a free chunk quickly.

C. Write process for TPV

Figure 5:
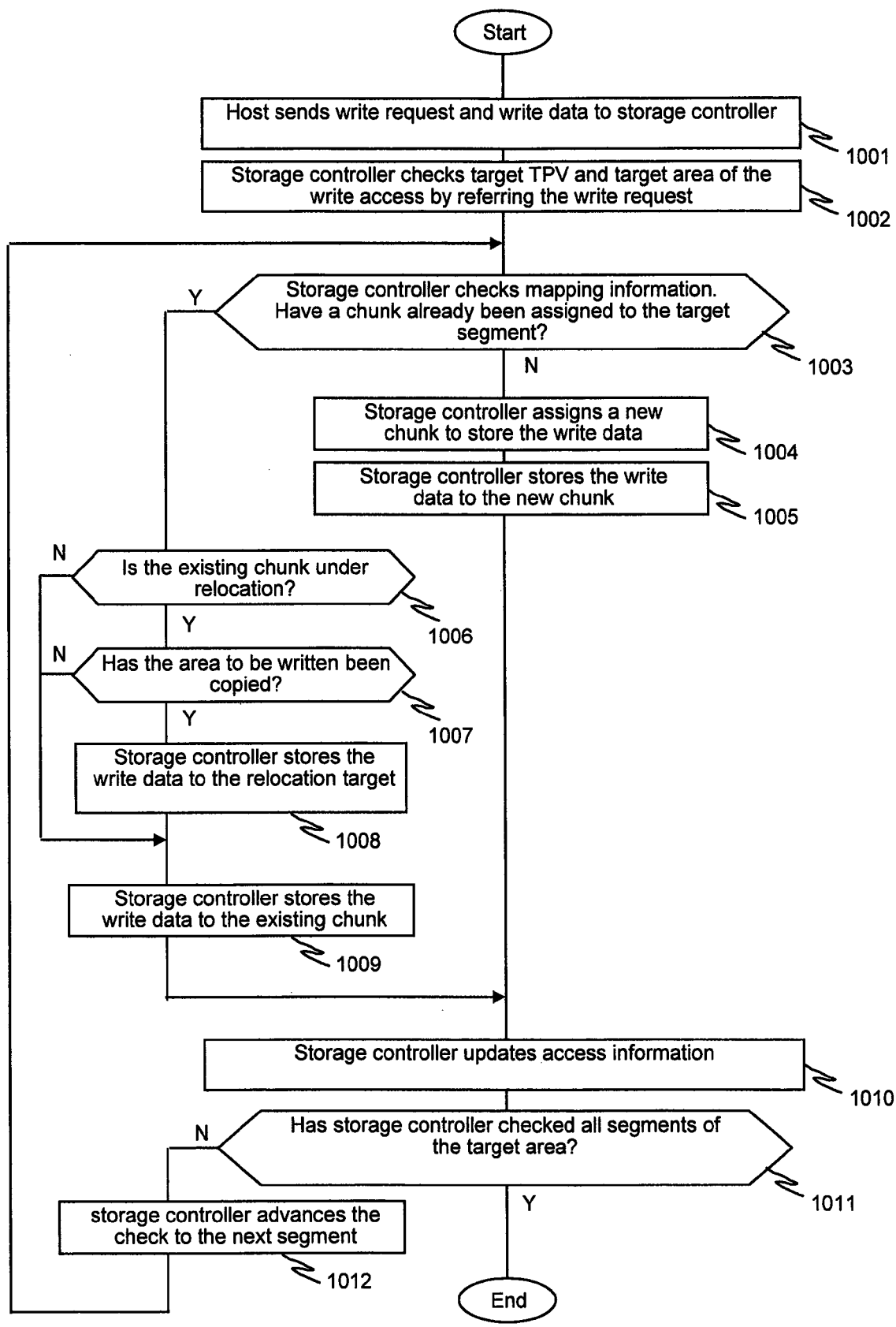
FIG. 5 is a flow diagram illustrating an example of a write process for TPV.

FIG. 5 is a flow diagram illustrating an example of a write process for TPV 610. At step 1001, the host 500 issues a write request and transfers write data to the storage controller 110. At step 1002, the storage controller 110 checks the target TPV 610 and the target area of the write access by referring to the write request. As shown in the mapping information 201 of FIG. 3, the target TPV 610 (TPV ID) is related to a pool group 700 (Pool Group ID) which is described below (see FIG. 9). At step 1003, the storage controller 110 checks the mapping information 201 for a segment in the target area. If a chunk has already been assigned to the segment, the process proceeds to step 1006. Otherwise, the process proceeds to step 1004. At step 1004, the storage controller 110 assigns a new chunk to store the write data from a predetermined tier in the pool group 700. To do this, the storage controller 110 updates the mapping information 201 and pool information 202. At step 1005, the storage controller 110 stores the write data to the new chunk, and then the process proceeds to step 1010.

At step 1006, the storage controller 110 checks the "under relocation" flag in the mapping information 201 of FIG. 3. This flag is set in a relocation process which is described later and shows whether the chunk is under relocation or not. If under relocation, the process proceeds to step 1007. Otherwise, the process proceeds to step 1009. At step 1007, by reference to the relocation information 206 which is described later, the storage controller 110 checks whether the area regarding write in the chunk has been copied in the relocation process. If yes, the process proceeds to step 1008. Otherwise, the process proceeds to step 1009. At step 1008, the storage controller 110 stores the write data to the relocation target. At step 1009, the storage controller 110 stores the write data to the existing chunk. At step 1010, the storage controller 110 updates the access monitor information 204. This information records access characteristics regarding the segment (i.e., page) and is used for determination of relocation described later. At step 1011, if the storage controller 110 has checked all segments of the target area, the process ends. Otherwise, the storage controller 110 advances the check to the next segment (from step 1012 back to step 1003).

FIG. 6 illustrates an example of the access monitor information 204. This maintains information regarding access to each segment such as the access frequency, access rate per unit time, last access time and average access length, for each of read and write. The information regarding average access length may be initialized at a certain interval. FIG. 7 is another example of the access monitor information 204. As shown in this figure, the information can be calculated and maintained as access characteristics in each period. The regular length of the period can be specified by the user via the management computer 520.

D. Read process for TPV

Figure 8:
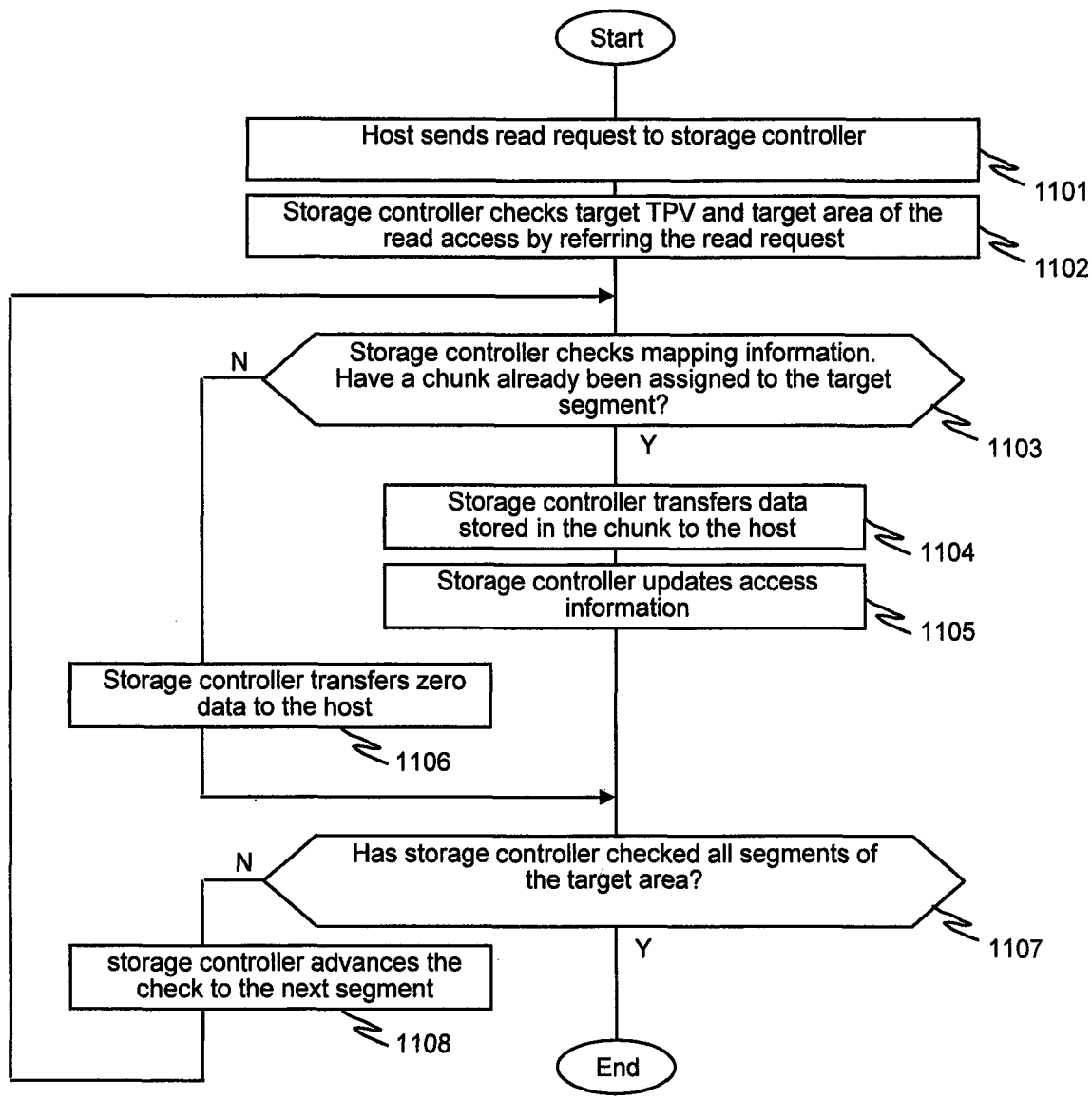
FIG. 8 is a flow diagram illustrating an example of a read process for TPV.

FIG. 8 shows a read process for TPV 610. At step 1101, the host 500 issues a read request to the storage controller 110. At step 1102, the storage controller 110 checks the target TPV 610 and the target area of the read access by referring to the read request. At step 1103, the storage controller 110 checks the mapping information 201 for a segment in the target area. If a chunk has already been assigned to the segment, the process proceeds to step 1104. Otherwise, the process proceeds to step 1106. At step 1104, the storage controller 110 transfers data stored in the chunk to the host 500. At step 1105, the storage controller 110 updates the access information 204. At step 1106, the storage controller 110 sends data of zero (0) to the host 500. At step 1107, if the storage controller 110 has checked all segments of the target area, the process ends. Otherwise, the storage controller 110 advances the check to the next segment (from step 1108 back to step 1103).

E. Pool Group and Tier Management

Figure 9:
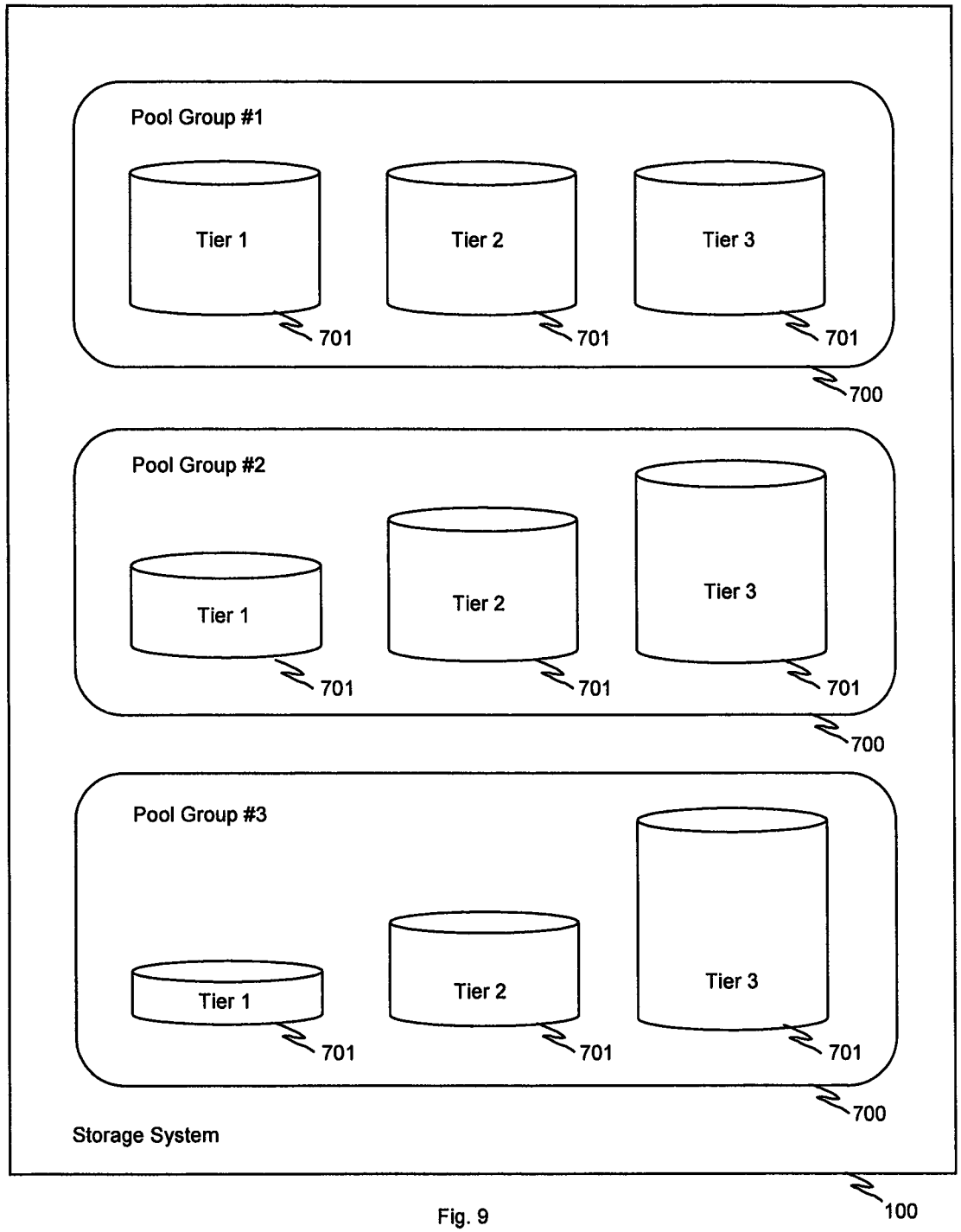
FIG. 9 illustrates the relationship between pool groups and categorized storage resources (tiers).

FIG. 9 illustrates the relationship between pool groups 700 and categorized storage resources (tiers) 701. As shown in FIG. 9, the storage system 100 possesses plural pool groups 700, and each pool group 700 has tiers 701 that each represent a class of storage resources (i.e., storage area). In one respect, a pool group 700 is a collection of tiers 701. The classification or the definition of tiers can be different among different pool groups 700. In other words, each pool group 700 can have its own definition of tiers 701. Typically, the tiers 701 are classified according to performance and cost of storage media (i.e., disk 600). For instance, "tier 1" means high performance and high cost media such as flash memory, "tier 2" means medium performance and medium cost media such as SAS HDD, and "tier 3" means low performance and low cost media such as SATA HDD. In FIG. 9, the size of each symbol indicating the tier 701 expresses the total capacity of the tier 701.

To manage pool groups 700, the storage controller 110 maintains the pool group information 203 illustrated in FIG. 10 and FIG. 11. FIG. 10 shows configuration relation for each pool group 700 (pool group ID), tiers 701, pool volumes 620 that comprise each tier 701, and capacity of each pool volume 620. FIG. 11 illustrates the characteristics of storage resources classified as tiers 701 in each pool group 700. In the examples shown in FIG. 11, the relation between the characteristics of tiers 701 and the capacity of tiers 701 in each pool group 700 is illustrated with the charts in which the capacity of tiers 701 is represented continuously on the horizontal axis, from high tier (i.e., tier 1) to low tier (e.g., tier 3). In the examples, tier 1 provides high performance (e.g., I/O rate and throughput) and low latency while tier 3 provides low performance and large latency.

As described below, according to the scoring rule of each pool group 700, a storage area (i.e., chunk 690) in higher tier 701 is assigned to data that expects storage area in higher tier 701 in the pool group 700 as automated tier management.

F. Relocation Decision Process for Automated Tier Management

Figure 12:
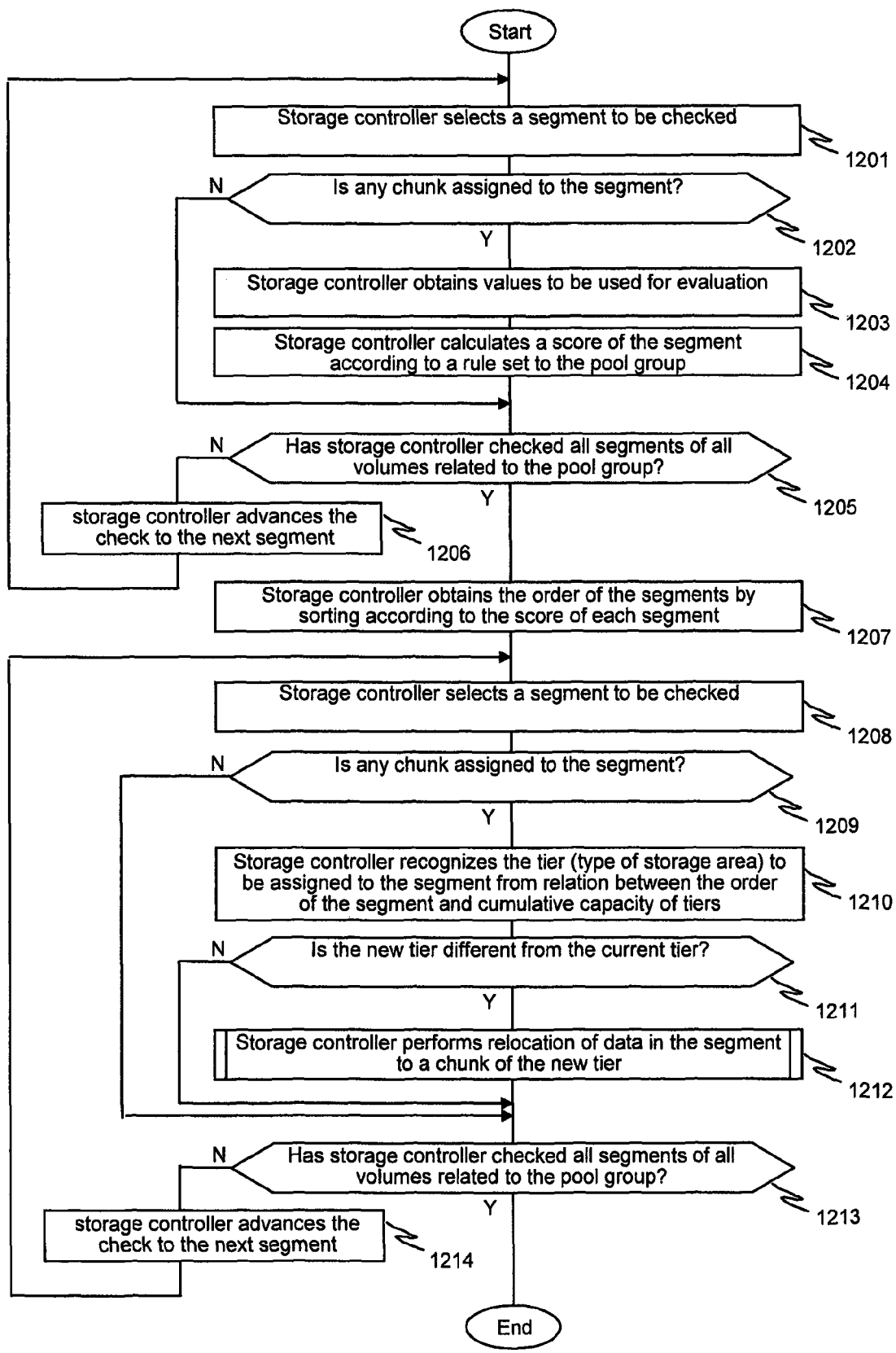
FIG. 12 shows a flow diagram illustrating an example of a process to determine the necessity and destination of relocation of data for automated tier management that is performed regularly as fundamental tier management.

FIG. 12 shows a flow diagram illustrating an example of a process to determine the necessity and destination of relocation of data for automated tier management that is performed regularly as fundamental tier management. At step 1201, the storage controller 110 chooses a segment (i.e., page) to be examined. At step 1202, the storage controller 110 determines whether a chunk 690 is assigned to the segment by reference to the mapping information 201. If there is a chunk 690 that is assigned to the segment, the process proceeds to step 1203. Otherwise, the process proceeds to step 1205. At step 1203, by reference to the access monitor information 204, the storage controller 110 obtains a value or values to be used to acquire a score. At step 1204, the storage controller 110 calculates a score for determination of an appropriate tier by using the above value(s) according to the scoring rule specified in the scoring rule information 205.

FIG. 13 illustrates an example of the scoring rule information 205. According to the condition indicated in this information, the storage controller 110 can calculate a score for the segment. That is, if one condition is satisfied, the points for satisfying the condition are added to the score (i.e., score equals total number of points). With the scoring rule formed by the conditions and the related point, the score of the segment indicates the necessity of the storage area to be in a higher tier. The scoring rule (i.e., conditions and points) can be different between different pool groups 700.

At step 1205, if the storage controller 110 has checked all segments of all TPVs 610 related to the pool group 700, the process proceeds to step 1207. Otherwise, the storage controller 110 advances the check to the next segment (from step 1206 back to step 1201).

At step 1207, the storage controller 110 obtains the order of the segments according to the acquired score of the segments. At step 1208, the storage controller 110 chooses a segment (i.e., page) to be examined. At step 1209, the storage controller 110 determines whether a chunk 690 is assigned to the target segment by reference to the mapping information 201. If there is a chunk 690 that is assigned to the segment, the process proceeds to step 1210. Otherwise, the process proceeds to step 1213. At step 1210, the storage controller 110 determines the tier 701 that should be assigned to the segment. Because the higher score of the segment means the necessity of the storage area to be in a higher tier, the tier 701 to be assigned can be specified by reference to the order of the segments according to the score of the segments. That is, the segments related to the pool group 700 occupy the storage area from high tier to low tier according to the order (i.e., from left to right in FIG. 11).

At step 1211, the storage controller 110 verifies whether the specified tier 701 to be applied to the segment is the same as the current tier 701 by reference to the mapping information 201. If the tier 701 to be applied is different from the current tier 701, the process proceeds to step 1212. Otherwise, the process proceeds to step 1213. At step 1212, the storage controller 110 performs the relocation of the data in the segment to the tier 701 to be assigned newly. The detailed process of relocation is described below. At step 1213, if the storage controller 110 has checked all segments of all TPVs 610 related to the pool group 700, the process ends. Otherwise, the storage controller 110 advances the check to the next segment (from step 1214 back to step 1208).

In order to adjust the actual location of data in TPV 610 according to the usage of data, the above relocation decision process is typically repeated at a predetermined interval or performed when the load of the storage system 110 is low. The scoring rule of each pool group 700 in scoring rule information 205 can be defined by users via the storage controller 110 or the management computer 520.

G. Relocation Process

FIG. 14 is a flow diagram illustrating an example of the relocation process performed in step 1212 of FIG. 12. At step 1301, the storage controller secures an unused chunk 690 as destination by reference to and by updating the pool information 202. At step 1302, the storage controller 110 makes an entry in the relocation information 206 for the segment to be moved. FIG. 15 shows an example of the relocation information 206. The relocation information 206 has the ID of the segment to be moved, information regarding the unused location selected as destination, and copy pointer that denotes the progress of copy. The storage controller 110 also sets a flag of "under relocation" for the segment in the mapping information 201 to "Yes."

At step 1303, the storage controller 110 copies data in the segment to the location selected as destination. According to the progress of the copying, the copy pointer in the relocation information 206 is updated and is moving forward. At step 1304, after completion of the copying, the storage controller 110 updates the mapping information 201 to change the mapping between the segment and the physical location according to the relocation. This realizes the transparent relocation of the segment for the host 500. At step 1305, the storage controller 110 updates the pool information 202 to release the old chunk 690 that was used for the segment. At step 1306, the storage controller 110 deletes the entry in the relocation information 206 and updates the mapping information 201 to set the flag of "under relocation" for the segment to "No."

H. Process for Special Rearrangement in Tier Management

Figure 16:
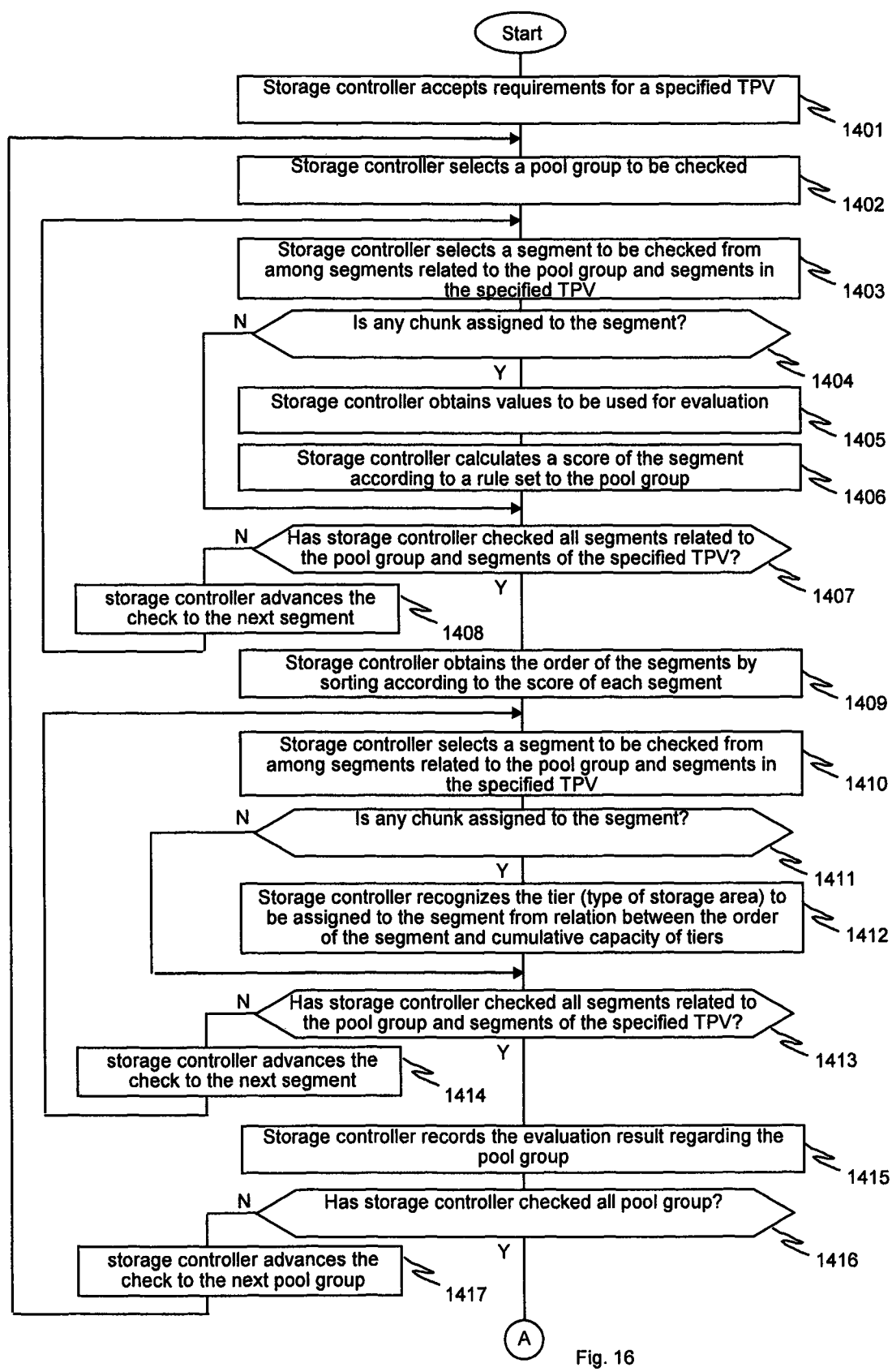
FIG. 16, FIG. 17, and FIG. 18 show a flow diagram illustrating an example of a process to handle a request to make the special rearrangement from a user, a host, or a management computer for applying the automated page-based tier management.
Figure 17:
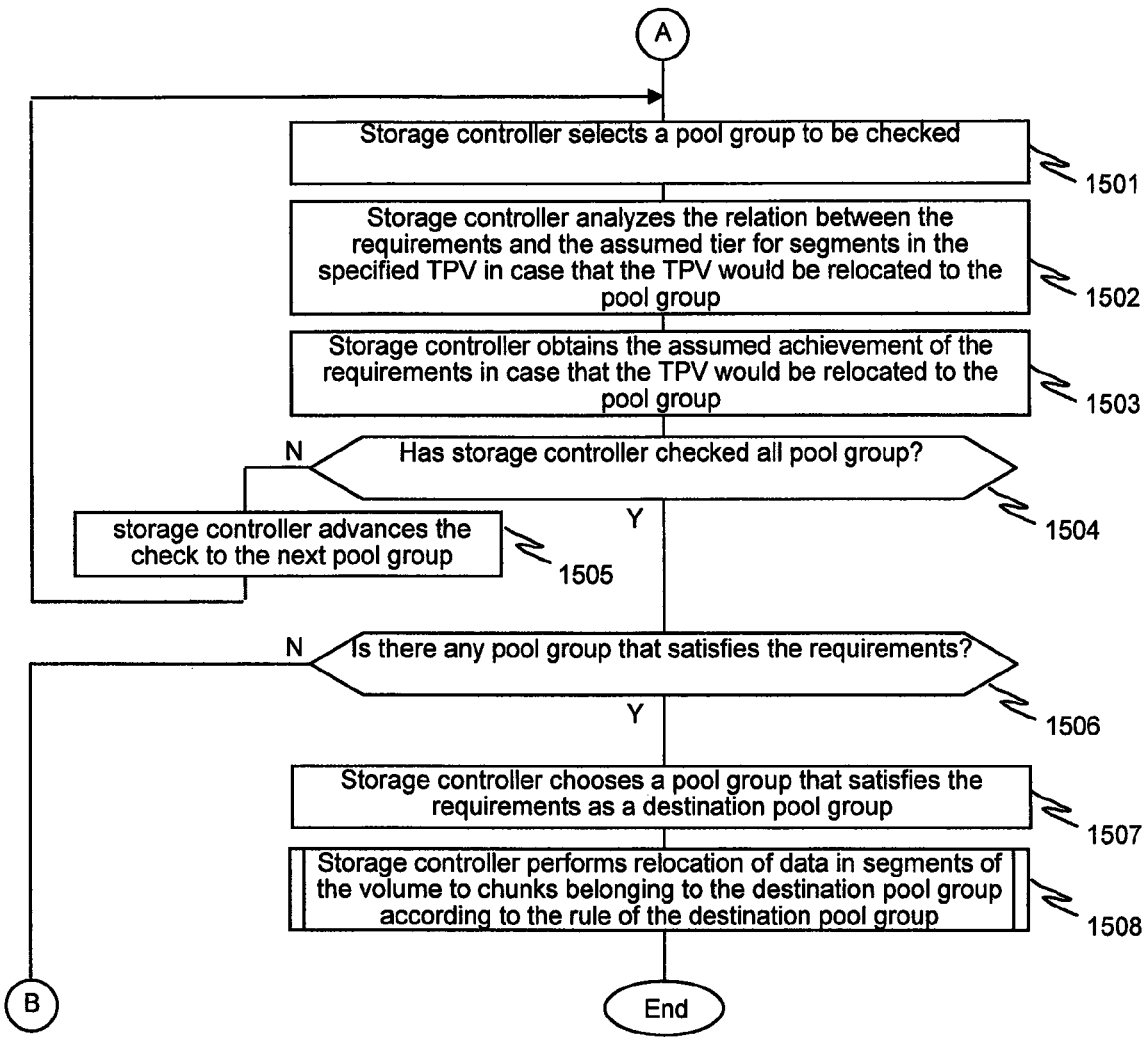
Figure 18:
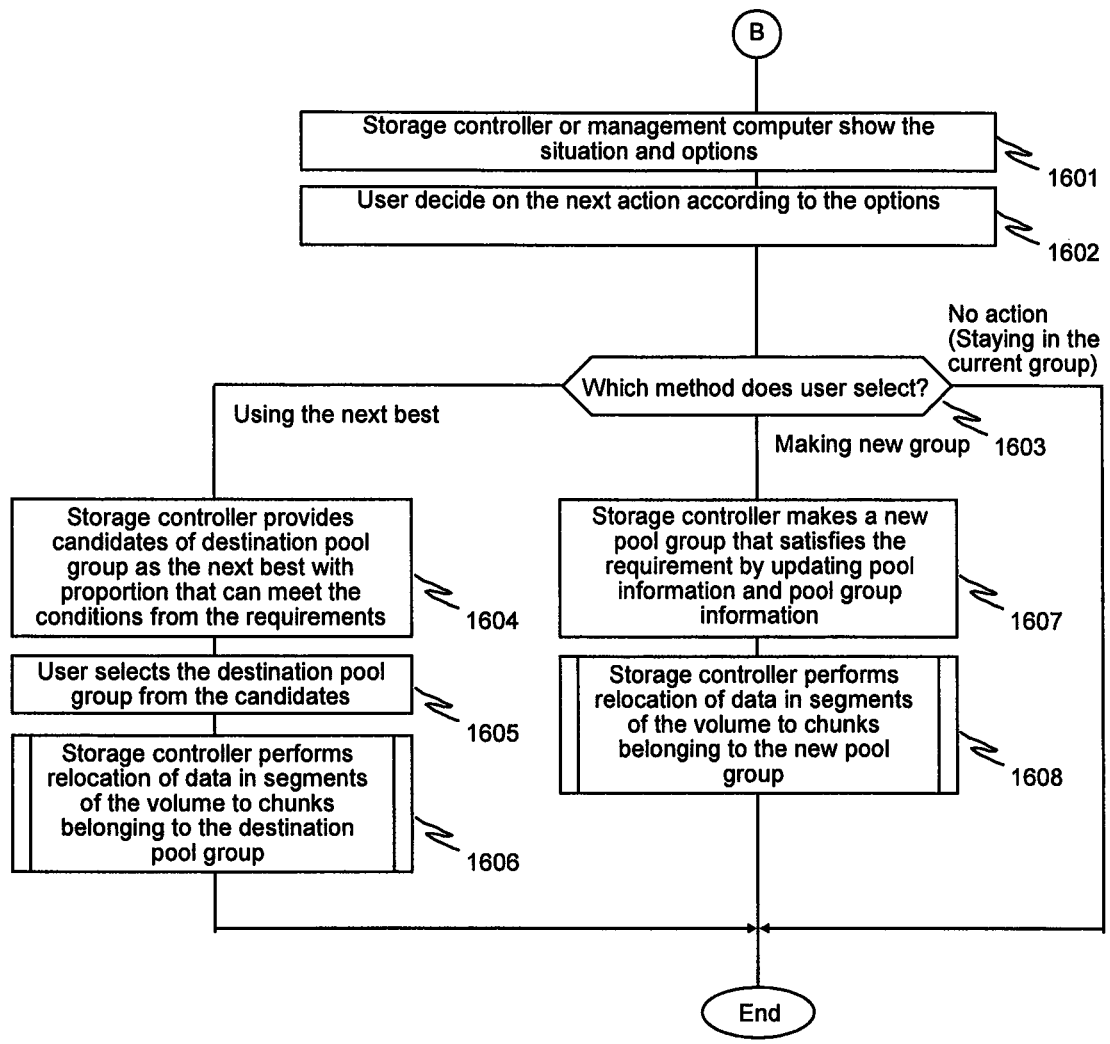

In this exemplary embodiment of the invention, the storage system 100 can handle an instruction to make special rearrangement from a user, a host 500, or a management computer 520 for applying the aforesaid automated page-based tier management. FIG. 16, FIG. 17, and FIG. 18 show a flow diagram illustrating an example of a process to handle a request to make the special rearrangement mentioned above.

In the portion of the flow diagram shown in FIG. 16, the storage controller 110 evaluates the pool groups 700 to achieve the rearrangement regarding a specified TPV 610. At step 1401, the storage controller 110 receives requirements to the rearrangement with a specified target TPV 610. For example, the requirements can be conditions regarding the performance and/or latency illustrated in FIG. 11. At step 1402, the storage controller 110 chooses a pool group 700 to be examined. At step 1403, the storage controller 110 chooses a segment (i.e., page) to be examined from among segments related to the pool group 700 and segments in the specified TPV 610. At step 1404, the storage controller 110 determines whether a chunk 690 is assigned to the segment by reference to the mapping information 201. If there is a chunk 690 that is assigned to the segment, the process proceeds to step 1405. Otherwise, the process proceeds to step 1407. At step 1405, by reference to the access monitor information 204, the storage controller 110 obtains a value or values to be used to acquire a score. At step 1406, the storage controller 110 calculates a score for determination of an appropriate tier by using the above value(s) according to scoring rule denoted in the scoring rule information 205, in the same manner as in the aforesaid relocation decision process (FIG. 12). At step 1407, if the storage controller 110 has checked all segments of all TPVs 610 related to the pool group 700 and segments of the specified TPV 610, the process proceeds to step 1409. Otherwise, the storage controller 110 advances the check to the next segment (from step 1408 back to step 1403).

At step 1409, the storage controller 110 obtains the order of the above segments according to the score of the segments. At step 1410, the storage controller 110 chooses a segment (i.e., page) to be examined from among the above segments. At step 1411, the storage controller 110 determines whether a chunk 690 is assigned to the target segment by reference to the mapping information 201. If there is a chunk 690 that is assigned to the segment, the process proceeds to step 1412. Otherwise, the process proceeds to step 1413. At step 1412, the storage controller 110 identifies the tier 701 that should be assigned to the segment in the same manner as in the aforesaid relocation decision process (FIG. 12). At step 1413, if the storage controller 110 has checked all segments of all TPVs 610 related to the pool group 700 and segments of the specified TPV 610, the process proceeds to step 1415. Otherwise, the storage controller 110 advances the check to the next segment (from step 1414 back to step 1410).

At step 1415, the storage controller 110 maintains the evaluation result regarding the pool group 700. From the evaluation result, the storage controller 110 can recognize the assumed tier 701 (i.e., candidate tier which has not been selected) of segments of the specified TPV 610 for the case of the specific pool group 700. At step 1416, if the storage controller 110 has checked all pool groups 700, the process proceeds to step 1501 in FIG. 17. Otherwise, the storage controller 110 advances the check to the next pool group 700 (from step 1417 back to step 1402).

In the portion of the flow diagram shown in FIG. 17, the storage controller 110 confirms whether there are one or more pool groups 700 that satisfy the requirements regarding a specified TPV 610 and executes the rearrangement. At step 1501, the storage controller 110 chooses a pool group 700 to be examined. At step 1502, the storage controller 110 analyzes the relation between the requirements (e.g., target performance) and the aforesaid assumed tier 701 for segments in the specified TPV 610 in case that the TPV 610 would be relocated to the pool group 700 by reference to the pool group information 203 and the evaluation result mentioned above. At step 1503, the storage controller 110 obtains the assumed achievement of the requirements (i.e., candidate achievement) in the case that the TPV 610 would be relocated to the pool group 700 through the above analysis. At step 1504, if the storage controller 110 has checked all pool groups 700, the process proceeds to step 1506. Otherwise, the storage controller 110 advances the check to the next pool group 700 (from step 1505 back to step 1501).

At step 1506, the storage controller 110 determines whether there are one or more pool groups 700 that satisfy the requirements by reference to the assumed achievement. If there are one or more pool groups 700 that satisfy the requirements, the process proceeds to step 1507. Otherwise, the process proceeds to step 1601 in FIG. 18. At step 1507, the storage controller 110 selects a pool group 700 that satisfies the requirements as a destination pool group 700. At step 1508, the storage controller 110 performs the relocation of data in segments of the TPV 610 to chunks belonging to the destination pool group 700 according to the rule of the destination pool group 700. The relocation of data between chunks is carried out in the same manner described above. That is, the rearrangement to satisfy the requirements is achieved. Then the process ends.

In the portion of the flow diagram shown in FIG. 18, the storage controller 110 executes an alternative approach of the rearrangement. At step 1601, the storage controller 110 presents the situation of no pool group 700 that satisfies the requirements and alternative options of the rearrangement to the user. The storage controller 110 can also show the assumed achievement of each pool group 700. By communication to share the related information between the storage controller 110 and management computer 520, the management computer 520 can present the situation and the options to the user. At step 1602, the user chooses an alternative approach from the proposed options described below. At step 1603, if the user wants to use the next best pool group 700, the process proceeds to step 1604. If the user wants to use a newly created pool group 700, the process proceeds to step 1607. If the user wants to do no action any more, the process ends.

At step 1604, the storage controller 110 presents candidates of destination pool group 700 as the next best. In regard to the candidates, the storage controller 110 may show the achievements or the proportion that can meet the condition from the requirements. At step 1605, the user chooses the destination pool group 700 from the candidates. At step 1606, the storage controller 110 performs the relocation of data in segments of the TPV 610 to chunks belonging to the destination pool group 700 according to the rule of the destination pool group 700. The relocation of data between chunks is carried out in the same manner described above. That is, the rearrangement is performed. Then the process ends.

At step 1607, the storage controller 110 creates a new pool group 700 that satisfies the requirements from unused resources by updating the pool information 202 and the pool group information 203. At step 1608, the storage controller 110 performs the relocation of data in segments of the TPV 610 to chunks belonging to the new pool group 700 according to the rule of the pool group 700. The relocation of data between chunks is carried out in the same manner described above. That is, the rearrangement to satisfy the requirements is achieved. Then the process ends.

With the method described above, manual/special rearrangement of data in tiered storage under applying automated page-based tier management is accomplished. In the above description, the destination pool group 700 and the alternative approach are selected by user(s). In other embodiments, these selections can be performed by the storage controller 110 automatically. Some policies can be provided by users for the automated selections in advance. In the above description, the requirements are designated for a volume (TPV 610). In other embodiments, the requirements can be designated for other types of storage area unit or data object such as an extent in a volume, one or more pages, a database table, or a file. In addition, the scoring rules used for the above processes can be expressed in more complicated manner than the above examples. In the above description, the automated tier management and the special rearrangement are controlled by the storage controller 110 with the programs possessed by the storage controller 110. In other embodiments, the management computer 520 can control the automated tier management and/or the special rearrangement by including the programs in management program 523 and by communication with the storage controller 110.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for the management of special rearrangement in automated page-based tier management regarding storage resources. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
   a processor;
   a memory;
   a plurality of storage volumes each being associated with one of a plurality of pool groups, each one of the pool groups including some of the plurality of storage volumes each being classified into one of a plurality of tiers within the one pool group; and
   a storage controller configured to perform automated page-based tier management of storing data in tiered storage using the pool groups, the page-based tier management including selecting the plurality of tiers within a pool group based on access characteristics for performing allocation against portions of one of the plurality of storage volumes;
   wherein the access characteristics are characteristics of access to the portions of the one of the plurality of storage volumes;
   wherein the page-based tier management performed by the storage controller includes evaluating the pool groups based on a preset rule for the page-based tier management in order to determine an evaluation result for each pool group based on the preset rule;
   wherein the storage controller is configured to use the evaluation results among the plurality of pool groups to determine which pool group is to be selected for performing allocation against portions of the one of the plurality of storage volumes; and
   wherein, in response to receiving an instruction for rearrangement of data in the tiered storage, the instruction including a requirement to be satisfied in selecting the plurality of tiers within a pool group based on the access characteristics for performing allocation against portions of the one of the plurality of storage volumes, the storage controller is configured to analyze the plurality of pool groups according to the requirement to determine whether any of the plurality of pool groups is appropriate to possess the one of the plurality of storage volumes for storing the data.

2. The storage system according to claim 1,
wherein, if at least one of the pool groups satisfies the requirement, the storage controller is configured to select a pool group that satisfies the requirement and perform relocation of the data to the selected pool group according to the instruction for rearrangement.

3. The storage system according to claim 2,
wherein one or more pool groups that satisfy the requirements are displayed to a user before the selection of the pool group.

4. The storage system according to claim 1,
wherein, if none of the pool groups satisfies the requirement, the storage controller is configured to select a next best pool group from the plurality of pool groups and perform relocation of the data to the selected next best pool group according to the instruction for rearrangement.

5. The storage system according to claim 4,
wherein the page-based tier management performed by the storage controller includes evaluating the pool groups based on a preset rule for the page-based tier management in order to determine an evaluation result for each pool group based on the preset rule;
wherein the storage controller is configured to use the evaluation results among the plurality of pool groups to determine which pool group is to be selected for performing allocation against portions of the one of the plurality of storage volumes; and
wherein none of the pool groups satisfies the requirement, and the storage controller is configured to select the next best pool group from the plurality of pool groups by analyzing relation between the evaluation results of the pool groups and the requirement.

6. The storage system according to claim 1,
wherein, if none of the pool groups satisfies the requirement, the storage controller is configured to create a new pool group that satisfies the requirement and perform relocation of the data to the new pool group according to the instruction for rearrangement.

7. The storage system according to claim 1,
wherein, if none of the pool groups satisfies the requirement, the storage controller is configured to not perform relocation of the data according to the instruction for rearrangement.

8. The storage system according to claim 1,
wherein the portions of the one of the plurality of storage volumes are chunks which are allocated in response to a write command received by the storage system.

9. The storage system according to claim 1,
wherein the page-based tier management performed by the storage controller includes evaluating the pool groups based on a preset rule for the page-based tier management in order to determine a score for each pool group based on access characteristics according to the preset rule; and
wherein the storage controller is configured to use the scores among the plurality of pool groups to determine which pool group is to be selected for performing allocation against portions of the one of the plurality of storage volumes.

10. The storage system according to claim 1,
wherein, if none of the pool groups satisfies the requirement, alternative options of the rearrangement are displayed; and
wherein the storage controller accepts selection of one option from the alternative options.

11. A storage system comprising:
a processor;
a memory;
a plurality of storage volumes each being associated with one of a plurality of pool groups, each one of the pool groups including some of the plurality of storage volumes each being classified into one of a plurality of tiers within the one pool group; and
a storage controller configured to perform automated page-based tier management of storing data in tiered storage using the pool groups, the page-based tier management including selecting the plurality of tiers within a pool group based on access characteristics for performing allocation against portions of one of the plurality of storage volumes;
wherein the access characteristics are characteristics of access to the portions of the one of the plurality of storage volumes;
wherein the page-based tier management performed by the storage controller includes evaluating the pool groups using a preset rule based on the access characteristics for the page-based tier management in order to determine an evaluation result for each pool group based on the preset rule; and
wherein, in response to receiving an instruction for rearrangement of data in the tiered storage, the instruction including a requirement to be satisfied in selecting the plurality of tiers within a pool group based on the access characteristics for performing allocation against portions of the one of the plurality of storage volumes, the storage controller is configured to analyze the plurality of pool groups according to the requirement and the evaluation results to determine whether any of the plurality of pool groups is appropriate to possess the one of the plurality of storage volumes for storing the data.

12. The storage system according to claim 11,
wherein the preset rule includes one or more conditions based on access characteristics, each condition having points associated with the access characteristics for the condition; and
wherein the storage controller is configured to sum the points for the one or more conditions to obtain a score for each pool group and to use the scores among the plurality of pool groups to determine which pool group is to be selected for performing allocation against portions of the one of the plurality of storage volumes.

13. The storage system according to claim 11,
wherein, if at least one of the pool groups satisfies the requirement, the storage controller is configured to select a pool group that satisfies the requirement and perform relocation of the data to the selected pool group according to the instruction for rearrangement; and
wherein, if none of the pool groups satisfies the requirement, the storage controller is configured to perform one of (i) selecting a next best pool group from the plurality of pool groups and perform relocation of the data to the selected next best pool group according to the instruction for rearrangement, or (ii) creating a new pool group that satisfies the requirement and perform relocation of the data to the new pool group according to the instruction for rearrangement, or (iii) not performing relocation of the data according to the instruction for rearrangement.

14. The storage system according to claim 13,
wherein none of the pool groups satisfies the requirement, and the storage controller is configured to select the next best pool group from the plurality of pool groups by analyzing relation between the evaluation results of the pool groups and the requirement.

15. The storage system according to claim 13,
wherein, if none of the pool groups satisfies the requirement, alternative options of the rearrangement are displayed; and
wherein the storage controller accepts selection of one option from the alternative options.

16. A storage system comprising:
a processor;
a memory;
a plurality of storage volumes each being associated with one of a plurality of pool groups, each one of the pool groups including some of the plurality of storage volumes each being classified into one of a plurality of tiers within the one pool group; and
a storage controller configured to perform automated page-based tier management of storing data in tiered storage using the pool groups, the page-based tier management including selecting the plurality of tiers within a pool group based on the access characteristics for performing allocation against portions of one of the plurality of storage volumes in accordance to a requirement to be satisfied for rearrangement of data in the tiered storage;
wherein the access characteristics are characteristics of access to the portions of the one of the plurality of storage volumes; and
wherein the storage controller is configured to analyze the plurality of pool groups according to the requirement to determine whether any of the plurality of pool groups is appropriate to possess the one of the plurality of storage volumes for storing the data.

17. The storage system according to claim 16,
wherein the page-based tier management performed by the storage controller includes evaluating the pool groups based on a preset rule for the page-based tier management in order to determine an evaluation result for each pool group based on the preset rule;
wherein the storage controller is configured to use the evaluation results among the plurality of pool groups to determine which pool group is to be selected for performing allocation against portions of the one of the plurality of storage volumes; and wherein the storage controller is configured to analyze the plurality of pool groups according to the requirement and the evaluation results to determine whether any of the plurality of pool groups is appropriate to possess the one of the plurality of storage volumes for storing the data.

18. The storage system according to claim 17,
wherein the preset rule includes one or more conditions based on access characteristics, each condition having points associated with the access characteristics for the condition; and
wherein the storage controller is configured to sum the points for the one or more conditions to obtain a score for each pool group; and
wherein the storage controller is configured to analyze the plurality of pool groups according to the requirement and the scores to determine whether any of the plurality of pool groups is appropriate to possess the one of the plurality of storage volumes for storing the data.

19. The storage system according to claim 16,
wherein, if at least one of the pool groups satisfies the requirement, the storage controller is configured to select a pool group that satisfies the requirement and perform relocation of the data to the selected pool group according to the instruction for rearrangement.

wherein, if none of the pool groups satisfies the requirement, the storage controller is configured to perform one of (i) selecting a next best pool group from the plurality of pool groups and perform relocation of the data to the selected next best pool group according to the instruction for rearrangement, or (ii) creating a new pool group that satisfies the requirement and perform relocation of the data to the new pool group according to the instruction for rearrangement, or (iii) not performing relocation of the data according to the instruction for rearrangement.

20. The storage system according to claim 19,
wherein the page-based tier management performed by the storage controller includes evaluating the pool groups based on a preset rule for the page-based tier management in order to determine an evaluation result for each pool group based on the preset rule; and
wherein none of the pool groups satisfies the requirement, and the storage controller is configured to select the next best pool group from the plurality of pool groups by analyzing relation between the evaluation results of the pool groups and the requirement.

* * * * *